US006320159B1

(12) United States Patent
Topp

(10) Patent No.: US 6,320,159 B1
(45) Date of Patent: Nov. 20, 2001

(54) WINDOW HEATER

(75) Inventor: Rainer Topp, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,821

(22) PCT Filed: Nov. 5, 1998

(86) PCT No.: PCT/DE98/03218

§ 371 Date: Jul. 18, 2000

§ 102(e) Date: Jul. 18, 2000

(87) PCT Pub. No.: WO99/27756

PCT Pub. Date: Jun. 3, 1999

(30) Foreign Application Priority Data

Nov. 20, 1997 (DE) .............................................. 197 51 423

(51) Int. Cl.[7] ................................ B60L 1/02; H05B 3/08
(52) U.S. Cl. ............................................ 219/203; 219/541
(58) Field of Search ..................................... 219/520, 522, 219/541, 202, 203; 338/323, 324, 325, 326, 328, 330

(56) References Cited

U.S. PATENT DOCUMENTS

| | | | | |
|---|---|---|---|---|
| 3,790,866 | * | 2/1974 | Meyer et al. | 257/702 |
| 4,132,881 | * | 1/1979 | Ciarniello et al. | 219/203 |
| 4,266,267 | * | 5/1981 | Ruegg | 361/717 |
| 4,538,170 | * | 8/1985 | Yerman | 257/705 |
| 5,459,348 | * | 10/1995 | Smith | 257/659 |
| 5,624,591 | * | 4/1997 | DeTrapani | 219/522 |
| 5,821,501 | * | 10/1998 | Zorn | 219/219 |
| 5,852,284 | * | 12/1998 | Teder et al. | 219/522 |

* cited by examiner

*Primary Examiner*—Sang Paik
(74) *Attorney, Agent, or Firm*—Kenyon & Kenyon

(57) ABSTRACT

A window heating system, in particular for heating a window of a motor vehicle, includes a resistance heating device, applied onto or integrated into the window, that is connectable to a heating voltage source via terminal contacts by way of an electrical switching device. The switching device is a semiconductor switching device arranged directly on the window to be heated.

6 Claims, 3 Drawing Sheets

WINDOW HEATER

FIELD OF THE INVENTION

The present invention relates to a window heating system, in particular for heating a window of a motor vehicle.

BACKGROUND INFORMATION

Window heating systems of the generic type are known. They usually possess a resistance heating device that is constituted in the form of electrical conductors arranged in meandering fashion on the window that is to be heated. The electrical conductors are applied onto a surface of the window as thin, planar or linear conductive strips or, in the case of composite windows, are integrated into a window pane cavity. When the resistance heating device is connected to a heating voltage source, usually the motor vehicle battery, the flow of an electrical current results in heating of the resistance heating device, which thereupon warms up the window that is to be heated.

In order to connect the resistance heating device to the heating voltage source, it is known to use an electrical switching means that can be activated by an operator of the motor vehicle. The electrical switching means are, for example, relays. These are usually arranged on a circuit board arranged in the instrument panel of the motor vehicle. It is further known to use, instead of the mechanical relays, semiconductor switching means, for example power transistors, although for adaptation to existing contact structures of the mechanical relays they are placed in adapter housings. Besides the additional costs associated therewith as a result of the use of the adapter housing, installation on a circuit board arranged below an instrument panel of the motor vehicle is relatively complex.

SUMMARY OF THE INVENTION

The window heating system according to the present invention offers, in contrast, the advantage that contacting of the resistance heating device to a heating voltage source is possible in a simple and economical fashion. Because the switching means is a semiconductor switching means arranged directly on the window that is to be heated, it is advantageously possible to contact the semiconductor switching means (available as standard components), without interposition of an adapter housing, directly to the resistance heating device on the window that is to be heated. Besides the elimination of an additional adapter housing, a further advantage which results is that the window to be heated serves simultaneously as support for the semiconductor switching means, and thus, by corresponding design of the resistance heating device, a circuit board for connection of the semiconductor switching means is simulated in simple fashion.

In a preferred embodiment of the present invention, provision is made for the semiconductor switching means to contain intelligent circuit components with which, preferably, automatic temperature sensing and temperature control of the resistance heating element are possible. In particular and very advantageously, by arranging the semiconductor switching means which has the intelligent circuits directly on the window it is possible to perform a direct temperature measurement of the window that is to be heated, and the window heating system can be automatically switched in or out as a function of a selectable control threshold.

DETAILED DESCRIPTION

Figure 1:
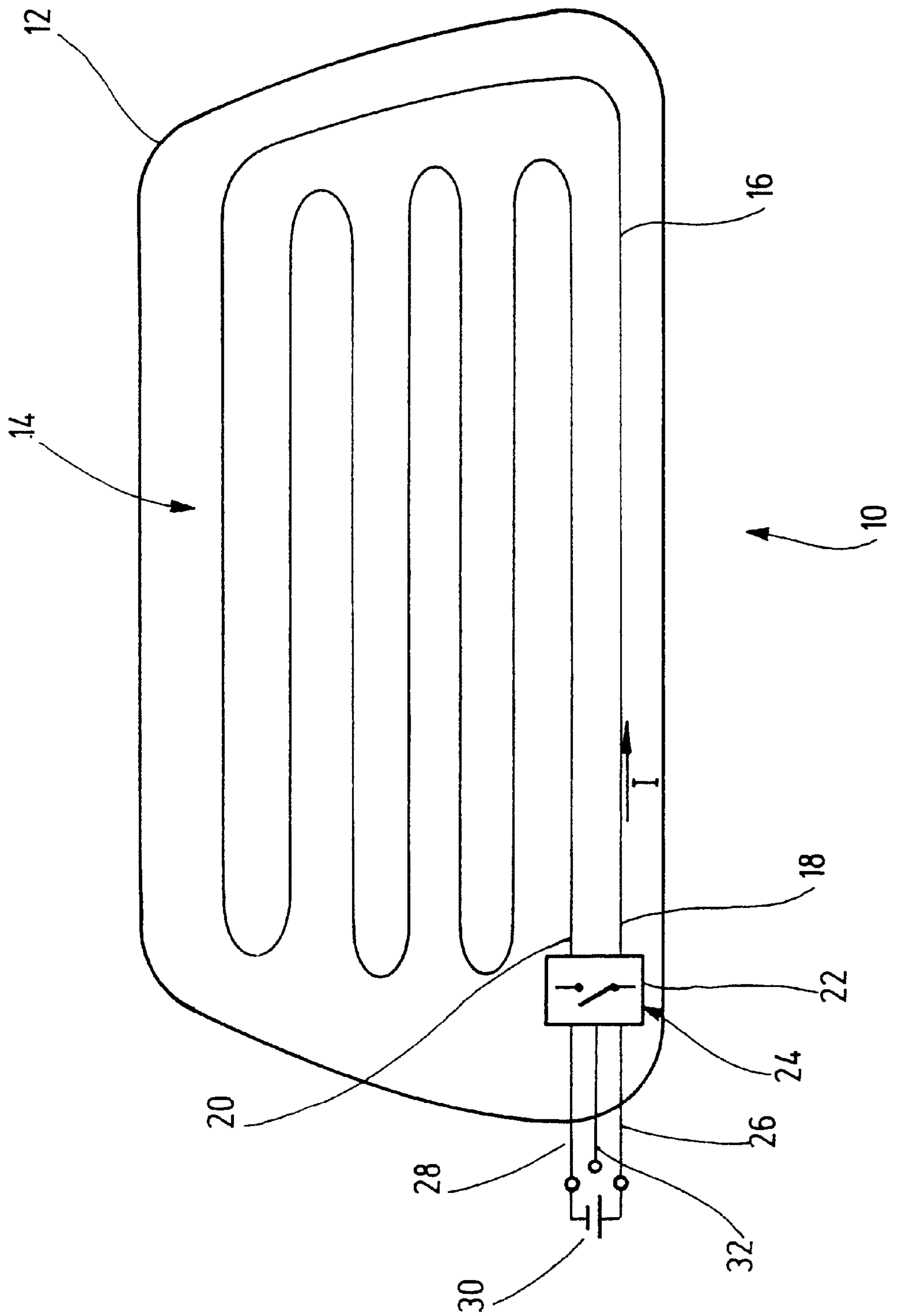
FIG. 1 shows a schematic overall view of a window heating system.

FIG. 1 shows a schematic view of a window heating system 10 for heating a window 12. Window 12 is, for example, a motor vehicle window, in particular a rear window, a windshield, or a side window. Window heating system 10 includes a resistance heating device 14 that is constituted by a conductor loop 16 arranged in meander fashion on window 12. Conductor loop 16 forms two terminal regions 18 and 20 which are contacted to a switching means 22. Switching means 22 is a power transistor, labeled in general as semiconductor switching means 24. Switching means 22 is connected via connection lines 26 and 28 to a heating voltage source 30, for example a motor vehicle battery. A control connection line 32 can be acted upon by a control signal so as to actuate switching means 22. Semiconductor switching means 24 is arranged directly on window 12. The position of semiconductor switching means 24 is selected so that it can be contacted on the one hand to connection lines 26, 28 and to control line 32, and on the other hand to terminal regions 18 and 20. One position of semiconductor switching means is, for example, in a corner region of window 12, which on the one hand is relatively protected from any mechanical stress and on the other hand need not necessarily be available for an unimpeded view through window 12.

The general function of window heating system 10 is known, so that it will not be discussed in detail in the context of the present description. Applying a signal to control line 32 causes semiconductor switching means 24 to change its switch position, so that heating voltage source 30 is connected to conductor loop 16. This results in the flow of a heating current I which, in known fashion, causes conductor loop 16 and thus window 12 to heat up.

Figure 2A:
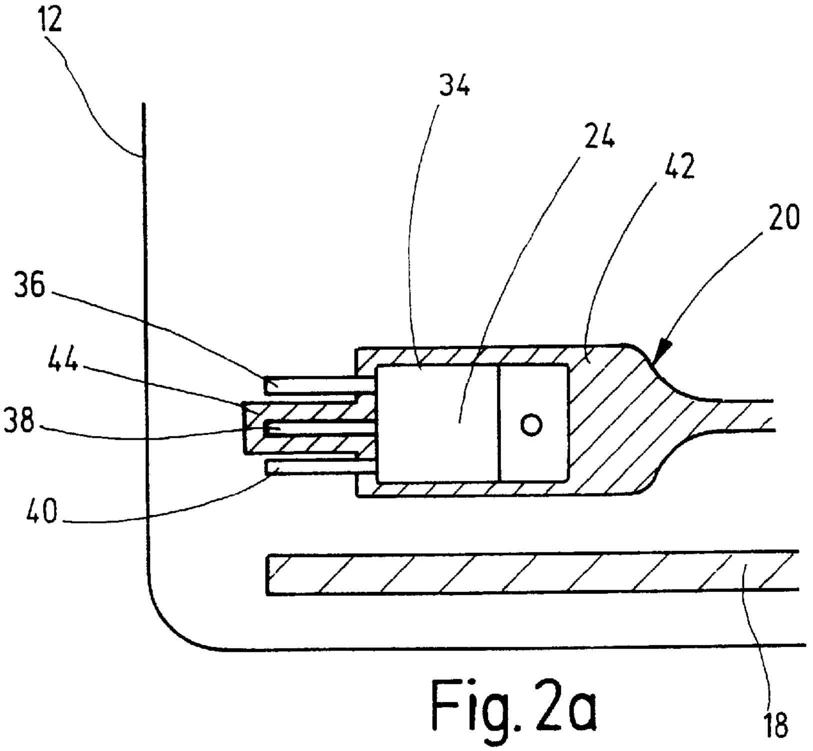
FIG. 2*a* shows a first diagram of the use of a semiconductor switching means in a first variant embodiment.

The arrangement of semiconductor switching means 24 on window 12 will be discussed with reference to the variant embodiments shown in FIGS. 2*a* and 2*b*, and 3*a* and 3*b*. These each show only a corner region of window 12 within which semiconductor switching means 24 are arranged. Parts identical to those in FIG. 1 are labeled with identical reference characters and not explained again. FIGS. 2*a* and 3*a* each show a schematic plan view, and FIGS. 2*b* and 3*b* each show a schematic side view, of the terminal region.

Figure 2B:
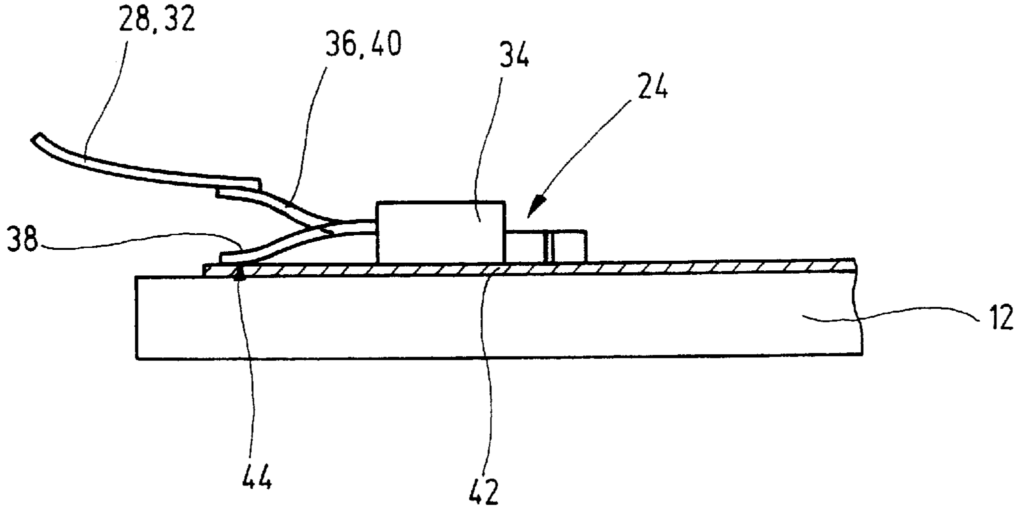
FIG. 2*b* shows a second diagram of the use of a semiconductor switching means in the first variant embodiment.
Figure 3A:
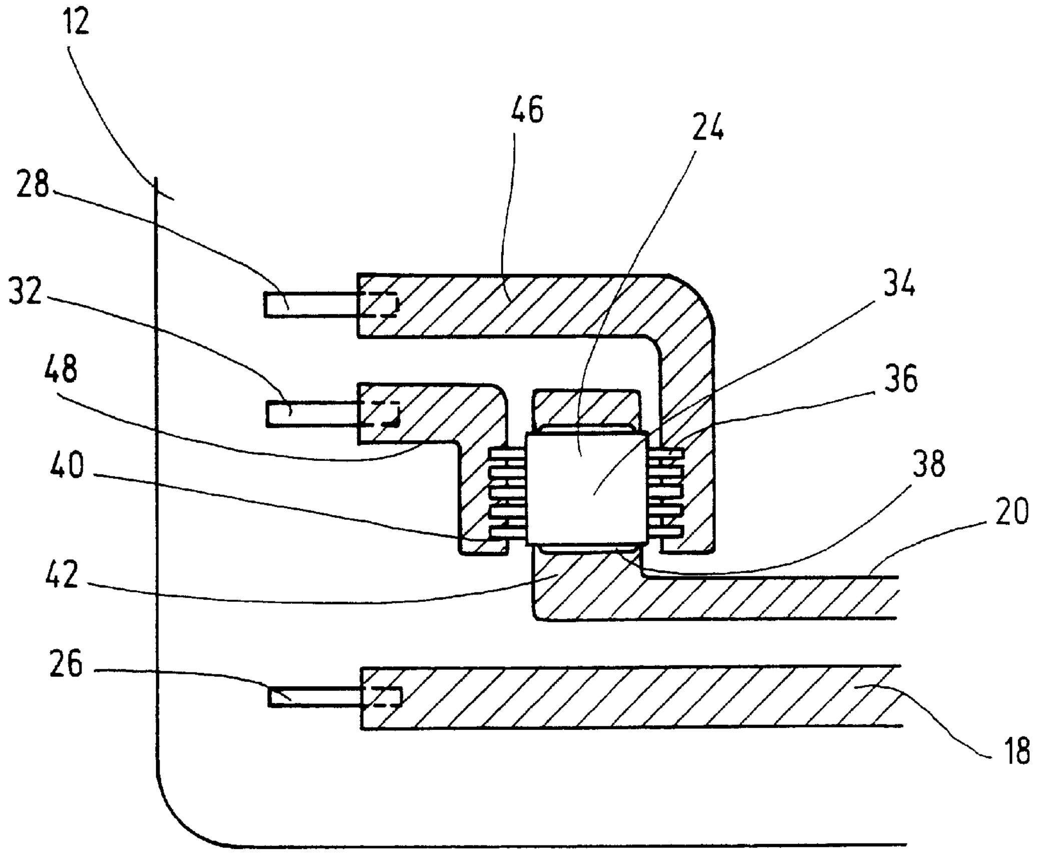
FIG. 3*a* shows a first diagram of the use of a semiconductor switching means in a second variant embodiment.

In FIGS. 2*a* and 2*b*, semiconductor switching means 24 is a standard power transistor known by the commercial designation TO-220. This possesses a standard housing 34 within which is arranged a silicon chip (not depicted in detail) that can be controlled via three external terminal contacts 36, 38, and 40. Terminal contacts 36 and 38 are the switching contacts, while terminal contact 40 is the control contact. Terminal contact 36 is connected to connection line 28, while terminal contact 40 is connected to control line 32. For this purpose, terminal contacts 36 and 40 can optionally be bent slightly away from window 12, as shown by the schematic side view in FIG. 2*b*. A connection from terminal contacts 36 and 40 to connection line 28 and control line 32, respectively, can be made, for example, by way of a solder join or other suitable electrically conductive contacts. Terminal contact 38 is contacted to a terminal lug 42 of terminal region 20.

When seen in the plan view shown in FIG. 2*a*, terminal lug 42 constitutes an enlargement and serves at the same time as a mounting substrate for semiconductor switching means 24. For this purpose, housing 34 of semiconductor switching means 24 can, for example, be fitted in planar fashion onto terminal lug 42. A nonpositive join can be made, for example, by adhesive bonding, soldering, or other suitable joining techniques. Terminal contact 38 is, for example, as shown once again by the schematic side view in FIG. 2*b*, angled in the direction of window 12 and is contacted, for example by soldering, to a finger-like extension of terminal lug 42.

It is immediately evident from the views shown in FIGS. 2*a* and 2*b* that the standardized semiconductor switching means 24 can easily be arranged directly on window 12. In this context, terminal region 20 of resistance heating device 14 simultaneously provides not only electrical contacting of semiconductor switching means 24 but also mechanical retention of semiconductor switching means 24 on window 12. In addition, waste heat of semiconductor switching means 24 can simultaneously be absorbed via terminal lug 42 and dissipated to window 12. In addition to the cooling associated therewith necessary for dissipation of waste heat of semiconductor switching means 24, an additional at least local heat source is available for heating window 12.

Figure 3B:
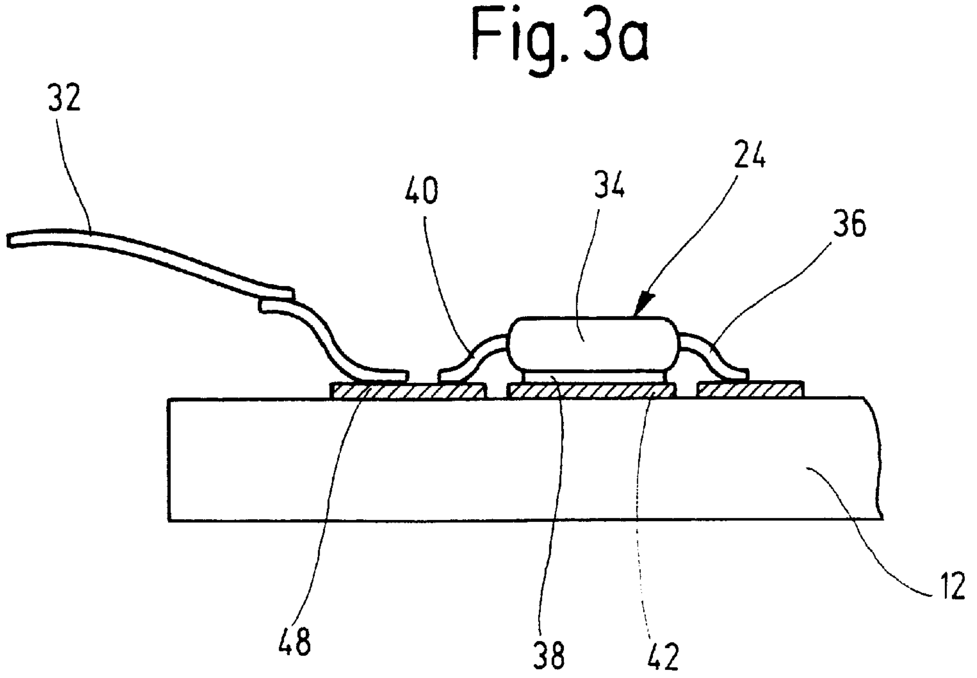
FIG. 3*b* shows a second diagram of the use of a semiconductor switching means in the second variant embodiment.

FIGS. 3*a* and 3*b* show a variant embodiment in which semiconductor switching means 24 is constituted by a standard power transistor that is available under the commercial designation PS-010. Its terminal contact 36 is mounted on contact lug 42 of terminal region 20 in accordance with the existing physical configuration of semiconductor switching means 24. Once again, what is accomplished here is an electrically conductive adhesive join or a solder join between terminal lug 42 and terminal contact 38, so that in addition to the electrical contacting, mechanical retention of semiconductor switching means 24 is simultaneously achieved. Terminal contact 36, formed here by a plurality of terminal feet, is connected to connection line 28 via an interconnecting conductive strip 46. Terminal contact 40—here also formed by a plurality of terminal feet—is also connected to control line 32 via an interconnecting conductive strip 48. The design of terminal lug 42 and of interconnecting conductive strips 46 and 48 is adapted to the predefined position of terminal contacts 36, 38, and 40 of semiconductor switching means 24. The delineation of terminal lug 42 and of interconnecting conductive strips 46 and 48 and of terminal regions 18 and 20 of conductor loop 16 can be accomplished simultaneously with the application of conductor loop 16 onto window 12. Window 12 thus serves simultaneously, in the transferred sense, as a circuit board for contacting semiconductor switching means 24.

According to further exemplary embodiments (not depicted in further detail), provision can be made for semiconductor switching means 24 to contain integrated intelligent circuits which make possible, for example, time control and/or temperature control of semiconductor switching means 24. Because of the direct thermal coupling of semiconductor switching means 24 to window 12, in particularly preferred fashion a temperature of window 12 can be ascertained and can be used as a controlled variable for switching semiconductor switching means 24 in or out. Optimum activation and deactivation of window heating system 10 can thus be ensured in accordance with selectable threshold values, so that the load on heating voltage source 30, constituted by the motor vehicle battery, is limited to a necessary minimum.

All in all, window 12, for example in the form of a motor vehicle window, can be prefabricated with a window heating system 10 already equipped with an integrated switching means 22, and can be inserted by the end user as a complete module. Only contacting to connection lines 26 and 28 and to control line 32 then needs to be performed; this can be done, for example, by way of simple plug connections without additional expedients.

What is claimed is:

1. A window heating system for heating a window of a motor vehicle, comprising:

a resistance heating device one of applied onto and integrated into the window, the resistance heating device including a conductor loop having terminal regions; and a semiconductor switching device for connecting the resistance heating device to a heating voltage source via terminal contacts, the switching device being situated directly on the window, the switching device being contacted directly to the terminal regions of the conductor loop, at least one of the terminal regions forming a terminal lug that provides an electrical contacting and provides a mechanical retention of the switching device on the window.

2. The window heating system according to claim 1, wherein the terminal lug serves as a thermal conductor for dissipating waste heat of the switching device.

3. The window heating system according to claim 1, wherein at least one of the terminal regions forms a design of conductive strips adapted to a terminal of the semiconductor switching device.

4. The window heating system according to claim 1, wherein the switching device includes intelligent circuit components with which at least one of a time control and a temperature control of the switching device is performed.

5. The window heating system according to claim 1, wherein the switching device connects and disconnects the resistance heating device to and from the heating voltage source as a function of a temperature of the window measured directly via the switching device.

6. The window heating system according to claim 1, wherein the switching device is configured as an integral component of the window for contacting to connecting lines and control lines of a wiring system of the motor vehicle.

* * * * *